(12) United States Patent
Jackson

(10) Patent No.: US 7,267,763 B2
(45) Date of Patent: Sep. 11, 2007

(54) WATER INTAKE SCREEN WITH CIRCULAR FILTER PANEL

(75) Inventor: Philip Jackson, Paris (FR)

(73) Assignee: E. Beaudrey et Cie, Paris (FR)

( * ) Notice: Subject to any disclaimer, the term of this patent is extended or adjusted under 35 U.S.C. 154(b) by 43 days.

(21) Appl. No.: 11/079,150

(22) Filed: Mar. 15, 2005

(65) Prior Publication Data

US 2005/0279680 A1 Dec. 22, 2005

(30) Foreign Application Priority Data

Jun. 22, 2004 (FR) .................................. 04 06776

(51) Int. Cl.
*E02B 5/08* (2006.01)
(52) U.S. Cl. ...................... 210/158; 210/159; 210/161; 210/162; 210/391; 210/415; 405/127
(58) Field of Classification Search ................ 210/158, 210/159, 161, 162, 391, 413, 415; 405/127
See application file for complete search history.

(56) References Cited

U.S. PATENT DOCUMENTS

| | | | | |
|---|---|---|---|---|
| 1,740,578 A | * | 12/1929 | D'Olier ...................... | 210/158 |
| 1,992,005 A | * | 2/1935 | Goldsborough ............. | 210/159 |
| 2,066,479 A | * | 1/1937 | Macisaac ..................... | 210/415 |
| 2,458,139 A | * | 1/1949 | Percival ....................... | 210/391 |
| 2,901,113 A | * | 8/1959 | Newell ......................... | 210/161 |
| 4,818,402 A | * | 4/1989 | Steiner et al. ............... | 210/413 |
| 4,867,879 A | * | 9/1989 | Muller ......................... | 210/415 |
| 5,116,490 A | | 5/1992 | Fontenot | |
| 5,851,087 A | * | 12/1998 | Berry, III ..................... | 210/161 |
| 6,500,331 B2 | * | 12/2002 | Massignani .................. | 210/158 |
| 2001/0054591 A1 | | 12/2001 | Gorshing | |

FOREIGN PATENT DOCUMENTS

| | | |
|---|---|---|
| DE | 39 32 229 | 4/1991 |
| DE | 100 15 112 | 10/2001 |

* cited by examiner

*Primary Examiner*—Christopher Upton
(74) *Attorney, Agent, or Firm*—Young & Thompson

(57) ABSTRACT

A water intake screen with a filter panel includes a frame adapted to be connected to the water intake and a circular filter panel disposed transversely in an opening of the frame, to which it is fastened. The panel includes a wheel extending in a substantially vertical plane between a lower position and an upper position and having radial retaining members on the upstream side of the panel and attached thereto, an aspiration device on the upstream side of the retaining members, and elements for driving the panel and/or aspiration device with a rotary relative movement so as to generate locally through the panel a successive counterflow at each retaining member in accordance with the rotary relative movement in order to take up successively debris and particles retained thereby and to direct them through an evacuation pipe adapted to evacuate the debris and particles to the exterior.

8 Claims, 3 Drawing Sheets

WATER INTAKE SCREEN WITH CIRCULAR FILTER PANEL

BACKGROUND OF THE INVENTION

1. Field of the Invention

The present invention relates to river and sea water intake screens with circular filter panels to prevent ingress of debris and particles carried by the water.

2. Description of the Prior Art

A water intake screen is generally disposed a few centimeters from the downstream side of a grid of bars protecting it from large debris, either on its own or in conjunction with one or more other screens of the same type forming part of the same screening station.

In the prior art, the filter element, which has a mesh size of only a few millimeters, is generally mobile so that it can be periodically cleared of debris and particles with dimensions greater than the mesh size, which progressively obstruct the whole of the mesh and therefore clog the filter-element.

This kind of mobile filter element may comprise a panel adapted to be raised in its own plane alternately with another panel of the same type disposed parallel to and a distance from it.

This kind of filter element may equally consist of an endless loop of elongate cross section constituting a filter chain known as a direct passage or double flow filter chain.

This kind of filter element may also consist of an endless loop of circular or polygonal cross section constituting a filter drum.

Be this as it may, this kind of mobile water intake filter element, whether it be a screen with a filter panel, a filter chain or a filter drum, is moved cyclically from an immersed position, in which it is progressively charged with debris and diverse particles, to a non-immersed position, in which counterflow pressurized water jets clear it of particles and debris accumulated on its surface in this way, so that on subsequent re-immersion it is again able to exercise its filtering function.

The particles and debris entrained by the washing water are usually collected in bulk in a channel provided for this purpose via which they are evacuated to a drain.

If there are any fish on the panels, they are removed from the water and suffer impacts that usually kill them.

Similarly, leaks may occur between the panels themselves or between the panels and fixed lateral uprights of the filter frame.

Moreover, fish trapped or entrained by the mobile filter element of this kind of water intake screen are inevitably removed from the water during the non-immersed phase of the filter element, often for a long period of time, and are subject to the usually violent action of the washing water jets applied to the filter element and to the resulting violent splashing in the channel for recovering the particles and debris temporarily clogging the filter element in question.

Direct passage chain filters, i.e. chain filters in which only the upstream face of the filter apron receives water to be filtered, also have various disadvantages, as follows:

Firstly, it is necessary to provide a sealing plate known as a footplate at the bottom of the sluice, at the base of the filter apron, to provide a seal between the apron and the bottom of the sluice, and this plate must be tangential to said apron.

Now, because of inevitable manufacturing and assembly tolerances and wear of components, and in particular wear of the apron support chains, there is always a minimum clearance between this kind of footplate and the filter apron; in practice, this clearance is never less than around 6 mm and often even larger.

As a result, with a view to consistency, the filter aprons of these direct passage chain filters cannot employ a mesh size of less than 6 mm, which limits the effectiveness of cleaning.

In double flow chain filters, the filter apron has generatrices parallel to the direction of flow of the stream of water to be filtered and the two faces of the filter apron exercise identical roles in parallel; said stream flows either from the outside to the inside of the filter apron across both faces thereof or in the opposite direction.

The supporting frame of this kind of double flow chain filter is usually disposed against facing masonry walls of the sluice.

These double flow chain filters have the advantage that, since no seal is required at the base of their apron, they allow the use of small mesh sizes, for example of less than 0.5 mm, with no inconsistency with any other lack of sealing.

They also have the advantage of allowing simultaneous use of both faces of their apron and therefore of doubling the effective filtering area, i.e. the capacity of the apparatus, for an equal volume.

However, double flow chain filters offer no improvement in terms of the survival of fish as compared to direct passage chain filters.

Various devices have already been proposed for equipping a water intake screening station with means for saving living creatures carried by the water taken in, and in particular fish. However, in installations of this type known at present, these devices are either special filters, which in themselves merely save fish without having any general screen function, or conventional screen filters, which means that any fish swept up remain out of the water for some time.

Thus a general object of the present invention is to enable the required screening of water intakes without the drawbacks of earlier structures and in a manner that is safe for fish.

Moreover, in the case of existing installations equipped with direct passage chain filters, the problem increasingly arises of improving cleaning efficiency by reducing the dimensions of the debris or organisms that can be blocked.

At present, however, substituting plant providing at least the same functionality without the same drawbacks and without modifying the civil engineering works or sluice hydraulics is no easier, the material conditions for implementation thereof being different.

Another general object of the present invention is to facilitate such substitution, if required.

SUMMARY OF THE INVENTION

According to a general definition of the invention, a water intake screen with a filter panel comprises a frame adapted to be connected to the water intake and a circular filter panel disposed transversely in a circular opening of the frame, to which it is fastened, wherein the circular filter panel comprises a wheel extending in a substantially vertical plane between a lower position and an upper position and comprising radial retaining members on the upstream side of the circular filter panel and attached thereto, an aspiration device on the upstream side of the retaining members, and means for driving the circular panel and/or the aspiration device with a rotary relative movement so as to generate locally through the circular filter panel a successive counterflow at each retaining member in accordance with the rotary relative movement in order to take up successively debris and particles retained thereby and to direct them through an evacuation pipe adapted to evacuate the debris and particles to the exterior.

In a first embodiment the circular filter panel is fixed and the drive means drive rotation of the aspiration device.

In a second embodiment the aspiration device is fixed and the drive means drive rotation of the circular filter panel.

In a third embodiment the drive means drive rotation of the aspiration device and the circular filter panel.

In practice the aspiration device comprises an aspiration pump and an aspiration horn.

The internal volume of the circular filter panel is preferably divided circumferentially into compartments by radial partitions forming the retaining members and the aspiration horn has a triangular contour in plan view the same size as or substantially larger than that of one of the compartments.

Alternatively, the aspiration device comprises two horns on respective opposite sides of the circular filter panel, one on its downstream side in the outflow direction and the other on its upstream side, in corresponding relationship to each other and both facing toward the circular filter panel and cooperating with the rotary relative movement, and a pump whose discharge side is connected to the horn on the downstream side of the circular filter panel.

When there are no fish to be saved, the evacuation pipe further comprises at least one debris concentrator.

In one embodiment the evacuation pipe comprises two debris concentrators and a set of valves for servicing the concentrators alternately.

If there are fish to be saved the evacuation conduit does not include a concentrator and water laden with debris and fish overflows directly into a pipe or a channel for returning it to the natural environment.

In practice the lower position of the circular filter panel corresponds to the bottom of a sluice and the upper position corresponds to a level close to that of the lowest water level.

According to another aspect of the invention the screen comprises at least two circular filter panels stacked one above the other in a vertical plane between the lower position, the upper position and each aspiration device is connected to common or separate evacuation means and the circular filter panels are driven by separate drive means or drive means common to the two circular filter panels.

In a further embodiment the screen is adapted to cooperate with the civil engineering works of and to be substituted for a direct passage chain filter formed of a channel consisting of a bottom and two rectilinear lateral walls in which are embedded vertical guides in which a frame of the direct passage filter is adapted to slide and a rectangular opening in a service floor generally flanked on its upstream side by a channel adapted to collect detritus expelled by washing jets and a flat structure bottom.

Other features and advantages of the invention will become apparent in the light of the following detailed description and the drawings.

DETAILED DESCRIPTION OF THE PREFERRED EMBODIMENTS

As shown in the figures, the invention relates to inserting a circular filter panel screen 1 into a water intake sluice 2 with parallel masonry walls 3 and 4 comprising respective vertical guides 5.

Figure 3:
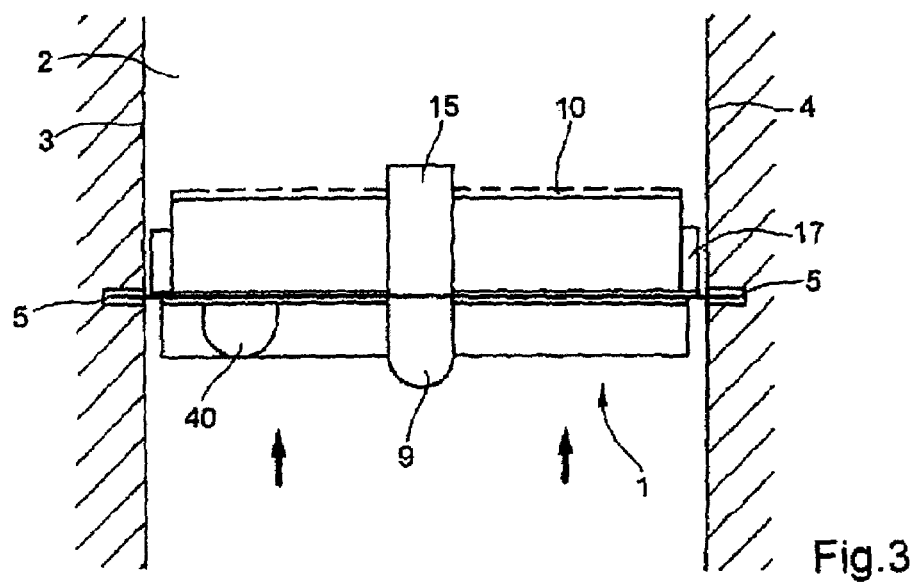
FIG. 3 is a view in cross section taken along the line BB in FIG. 1.

These guides 5 are made of metal, for example, and each forms a groove, as may be seen in FIG. 3.

The sluice 2 is equipped with a supporting plate or frame 6 extending from one wall 3 to the other wall 4 and sliding in the guides 5. The plate 6 has a circular opening substantially centered on its axis 13. The lower portion of the circular opening is usually very close to the bottom 14 of the sluice 2. The circular opening is blocked by a concentric wheel 7 comprising spokes 8, a hub 9, and a filter element 10 fixed to its downstream side. The spokes 8 extend from the hub 9 to a rim 11 and are generally distributed around the disk. The spokes 8 are attached to the downstream filter element 10. The radial partitions 12 form boxes or elements for retaining detritus and particles. The width of the partitions 12 in the upstream to downstream direction is several centimeters, for example.

The diameter of the disk is preferably as large as possible, i.e. slightly less than the width of the sluice 2, to increase its area.

The lowest water level LWL is generally situated at least at the upper level of the rim 11 of the wheel. The lowest water level PBE may be higher or lower than this, however, depending on associated constraints.

The hub 9 of the disk is provided with bearings and mechanical abutments known in the art. The hub 9 is carried by a shaft 15 fixed to the support plate 6 by radial arms 16 connected to the fixed hub 9 carrying the shaft 15.

In a vertical plane and globally aligned with and above the plate 6 carrying the disk is a plate or solid wall 20 extending from one lateral wall 3 to the other lateral wall 4 to prevent water passing from the upstream side to the downstream side of the filter disk 7 without passing through the filter element 10. This wall 20 extends at least to a level generally the same as or higher than the highest water level HWL.

The solid wall 20 may instead be replaced with a transverse masonry wall.

The disk 7 is centered by the hub 9 and driven in rotation by drive means including peripheral gear teeth 17, a pinion 18 and a drive motor 19.

The filter element 10 may be conical or cylindrical in the upstream or downstream direction instead of being plane.

A radial horn 30 extends from the hub 9 to the periphery of the disk 7. The horn 30 is fixed to the fixed hub 9 and to the support plate 6 and has a plane surface facing the disk 7.

In practice, the internal volume of the disk 7 equipped with the filter element 10 is divided circumferentially into compartments by the radial partitions 12 forming the retaining members. The horn 30 has a contour that is triangular in plan view and the same as or substantially larger than the contour of a compartment of this kind.

The horn 30 has an opening that may be equipped with flexible lips in order to reduce its section without preventing the occasional passage of bodies of larger size. The horn 30, the general shape of which is globally divergent from the center of the circular opening to its outside perimeter, is connected to an aspiration unit such as a pump 40 fixed to the wall 6.

The pump 40 is supplied with power via a cable (not shown), for example, and is selected so that it is capable of pumping large debris and, where appropriate, is of a type also ensuring a very high fish survival rate. Water is evacuated toward its collection point via a generally vertical pipe 50 just above the highest water level (usually at the level of a service floor 23). The pipe rises above the service floor 23 to a 180° bend 51 whose outlet 52 feeds a debris concentrator 60 known in the art and consisting, for example, of a cylindrical vertical screen, a cylindrical envelope, a radial water outlet 62 in the lower portion of the envelope, an axial debris drain 61 in the lower portion of the envelope, and a set of valves 71 and 72.

Water laden with debris arrives from above and passes through the screen, which blocks and stores debris.

Alternatively, the aspiration device comprises two horns disposed on respective opposite sides of the circular filter panel, one on the downstream side in the outgoing flow direction and the other on the upstream side, in corresponding relationship to each other and both facing toward the circular filter panel, cooperating with the rotary relative movement thereof, and a pump whose discharge side is connected to the horn on the downstream side of the circular filter panel.

Alternatively, the evacuation pipe comprises two debris concentrators (not shown) and a set of valves serving the two concentrators alternately.

When there are fish to be saved, the evacuation pipe has no concentrator and water laden with debris and fish overflows directly into a pipe or a channel for returning it to the natural environment.

Figure 1:
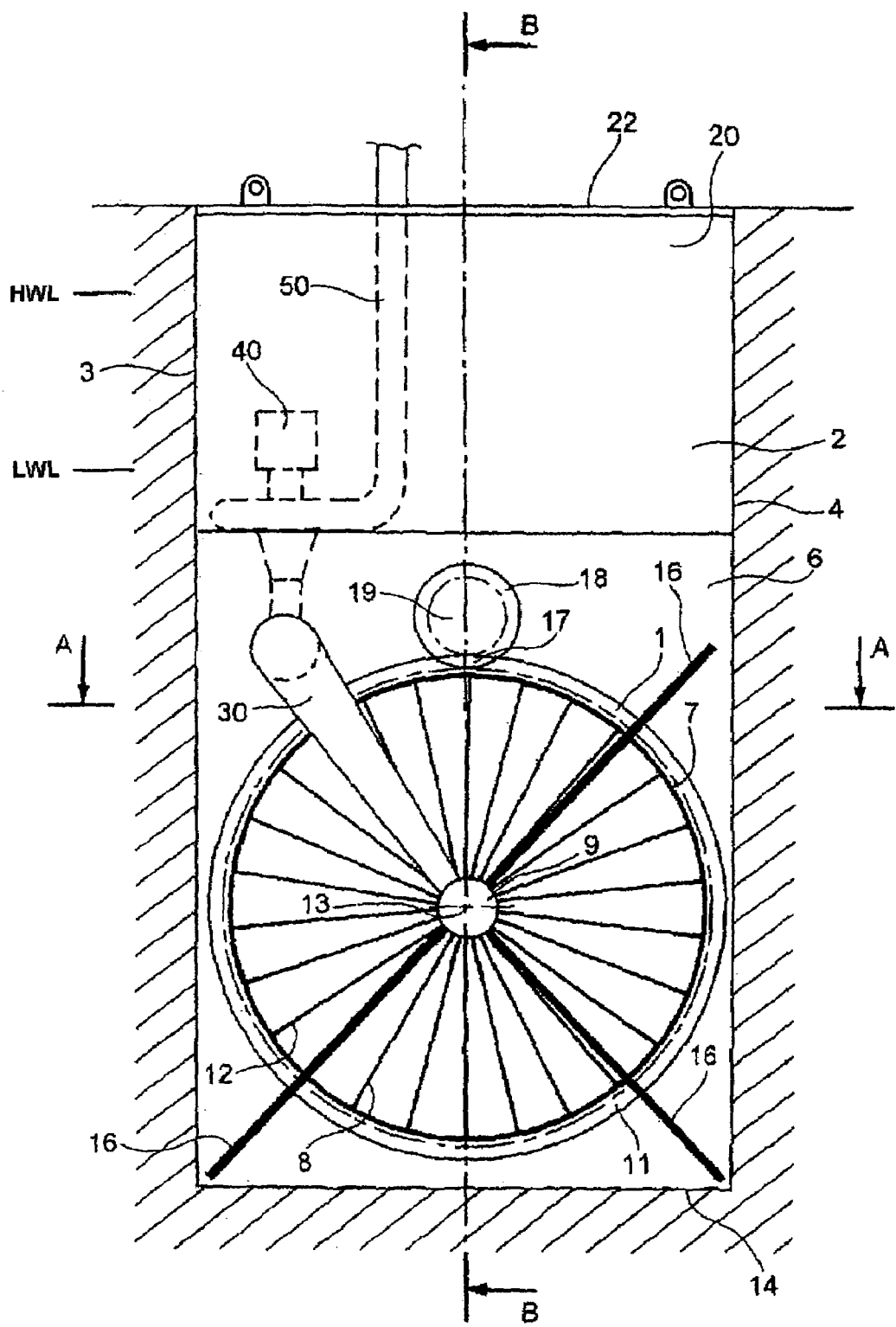
FIG. 1 is a view in cross section of a water intake sluice equipped with a circular filter panel screen of the invention, as seen from the upstream side.
Figure 2:
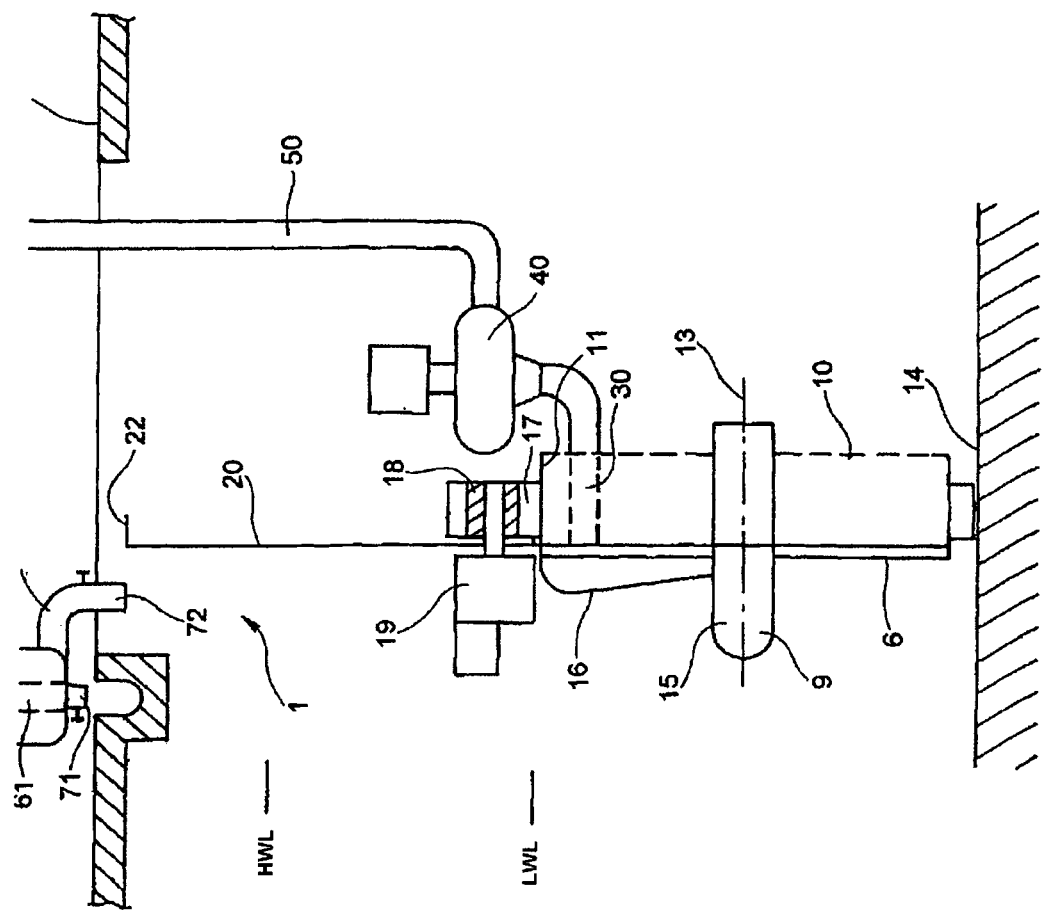
FIG. 2 is a view of the sluice in elevation in horizontal section taken along the line AA in FIG. 1.
Figure 4:
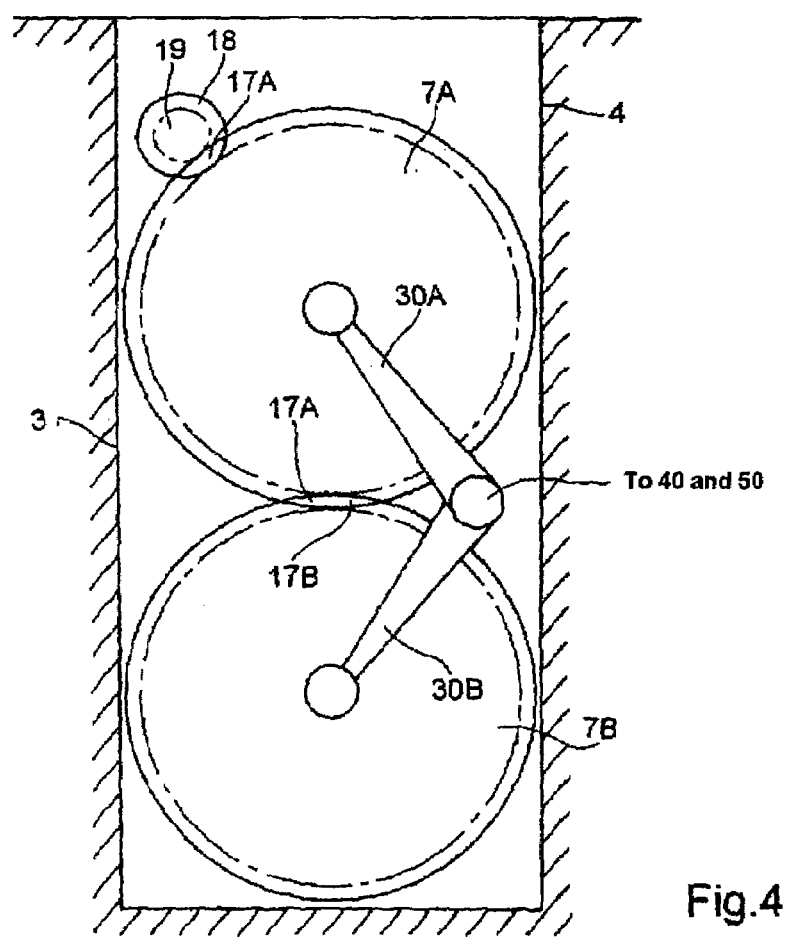
FIG. 4 is a view in cross section identical to FIG. 1 of two stacked filter panels of the invention.

FIG. 4 shows an installation equipped with two circular filter panels 7A and 7B stacked one above the other, each of which is structurally and functionally identical to the circular filter panel 7 described with reference to FIGS. 1 to 3.

For example, each aspiration device 30A and 30B is connected to common or separate evacuation means for common or separate discharge to the exterior. Similarly, the disks 7A and 7B are driven by separate or common drive means 18 and 19 and gear systems 17A and 17B.

FIGS. 1 to 4 show an embodiment in which the aspiration device 30 is fixed while the drive means 17, 18, 19 drive rotation of the circular filter panel.

In a variant that is not shown, the circular filter panel is fixed and the drive means drive rotation of the aspiration device.

In another variant that is not shown the drive means drive rotation of the aspiration device and the circular filter panel.

The screen operates as follows: when stopped, the filter disk 7 is stopped, the pump 40 is not operating, and water flows through the filter disk. Debris is stopped by the filter element 10 of the disk and retained in the radial compartments 12 of the disk. To clean the filter 7, the pump 40 is started and the disk is rotated by the drive system 17, 18, 19. The disk turns and the radial compartments 12 pass in turn in front of the opening of the horn 30, where they are isolated from the general flow by the front face of the horn. Aspiration by the pump creates a flow in the compartment in the opposite direction to that of normal screening and at a similar speed. Debris is aspirated into the horn 30, through the pump 40, rises up the vertical pipe 50, and is blocked in the concentrator 60.

The pumped water freed of debris returns to the channel on the upstream side of the filter disk via the pipe 62. Rotation of the disk is stopped after a minimum of slightly more than one complete rotation. This cleans the filter disk completely.

If large debris in a compartment stops rotation of the disk, the drive system 17, 18, 19 is stopped by a force limiter known in the art and rotation in the opposite direction is started, which is generally sufficient to remove the debris causing the blockage.

The washing pump 40 and rotation are stopped at the end of the washing cycle. Water in the concentrator 60 is evacuated after closing the valve 72 and opening the valve 71. The debris then drops into the detritus channel in the upper floor 23. The outlet valve 71 of the concentrator 60 is then closed.

Note that continuous operation by repetition of the cleaning cycle is possible. It suffices to provide two detritus concentrators and one set of valves such that each operates in turn.

When it is necessary to recover alive fish and other aquatic life forms blocked by the filter disk, the pump used is of an appropriate type known in the art. The concentrator 60 is eliminated and water laden with debris and fish overflows directly into a pipe or channel for returning it to the natural environment.

Operation is normally automatic and slaved to the head loss generated by the filter disk, i.e. to the degree to which it is soiled. The installation comprises devices known in the art.

The size of debris aspirated into this kind of water intake is limited by the grid of bars at the inlet. This debris may then be stored pending washing thanks to the size of the compartments, in particular the distance between the face of the filter element and the upstream end of the horizontal partitions of said compartments.

Note that the screen according to the invention prevents bypassing of the system.

Neither does it generate any significant turbulence in the outflow. It is therefore better than a double flow chain filter.

When it is necessary to recover fish and other aquatic life forms and to return them to the natural environment as quickly as possible, the concentrator 60 is omitted and the washing water is conveyed by means known in the art to a location where it can be recycled to the water intake.

A screen of the invention of the above kind has the advantage that it is able to slide in vertical guides cooperating with existing direct passage chain filter support structures.

The filter element 10 may have a circular, rectangular, square or slotted mesh with dimensions of the order of 10×10 mm to 0.5×0.5 mm.

The screen of the invention also finds an application in sluices that are slightly inclined to the vertical.

The invention claimed is:

1. Water intake screen with filter panel, comprising a frame adapted to be connected to said water intake and a circular filter panel disposed transversely in a circular opening of said frame, to which it is fastened, wherein said circular filter panel comprises a wheel extending in a substantially vertical plane between a lower position and an upper position and comprising radial retaining members on the upstream side of said circular filter panel and attached thereto, an aspiration device on the upstream side of said retaining members, and means for driving said circular panel and/or said aspiration device with a rotary relative movement so as to generate locally through said circular filter panel a successive counterflow at each retaining member in accordance with said rotary relative movement in order to take up successively debris and particles retained thereby and to direct them through an evacuation pipe adapted to evacuate said debris and particles to the exterior, wherein said aspiration device comprises an aspiration pump and an aspiration horn, and wherein the internal volume of said circular filter panel is divided circumferentially into compartments by radial partitions forming said retaining members and said aspiration horn has a triangular contour in plan view the same size as or substantially larger than that of one of said compartments.

2. The screen claimed in claim 1 wherein said circular filter panel is fixed and said drive means drive rotation of said aspiration device.

3. The screen claimed in claim 1 wherein said aspiration device is fixed and said drive means drive rotation of said circular filter panel.

4. The screen claimed in claim 1 wherein said drive means drive rotation of said aspiration device and said circular filter panel.

5. The screen claimed in claim 1 wherein said evacuation conduit does not include a concentrator and water laden with debris and fish overflows directly into a pipe or a channel for returning it to the natural environment.

6. The screen claimed in claim 1 wherein said lower position of said circular filter panel corresponds to the bottom of a sluice and said upper position corresponds to a level close to that of the lowest water level.

7. The screen claimed in claim 1 wherein said screen comprises at least two circular filter panels stacked one above the other in a vertical plane between said lower position, said upper position and each aspiration device is connected to common or separate evacuation means and said circular filter panels are driven by separate drive means or drive means common to said two circular filter panels.

8. The screen claimed in claim 1 wherein said circular filter panel comprises a circular, rectangular, square or slotted mesh with a mesh size from 10×10 mm to 0.5×0.5 mm.

* * * * *